United States Patent
Frincu et al.

(10) Patent No.: US 10,841,221 B2
(45) Date of Patent: Nov. 17, 2020

(54) STAGE ONE CACHE LOOKUP FOR NETWORK NODE OF MESH NETWORK

(71) Applicant: Arm Limited, Cambridge (GB)

(72) Inventors: Andrei-Catalin Frincu, Bucharest (RO); Georgel Bogdan Alexandru, Bucharest (RO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/275,748

(22) Filed: Feb. 14, 2019

(65) Prior Publication Data

US 2020/0162381 A1 May 21, 2020

(30) Foreign Application Priority Data

Nov. 20, 2018 (EP) ...................... 18464004

(51) Int. Cl.
*H04L 12/747* (2013.01)
*H04L 29/08* (2006.01)
*H04W 4/80* (2018.01)
*H04L 29/06* (2006.01)
*H04L 12/741* (2013.01)
*H04W 84/18* (2009.01)

(52) U.S. Cl.
CPC .......... *H04L 45/742* (2013.01); *H04L 45/745* (2013.01); *H04L 63/0414* (2013.01); *H04L 63/0428* (2013.01); *H04L 67/2842* (2013.01); *H04W 4/80* (2018.02); *H04W 84/18* (2013.01)

(58) Field of Classification Search
CPC .... H04L 67/42; H04L 29/06068; H04L 45/00
See application file for complete search history.

(56) References Cited

U.S. PATENT DOCUMENTS 9,236,936 B2 * 1/2016 Qin .................... H04B 7/18582

* cited by examiner

*Primary Examiner* — Chandrahas B Patel
(74) *Attorney, Agent, or Firm* — Nixon & Vanderhye P.C.

(57) ABSTRACT

A network node for a mesh network may control processing of an incoming PDU with reference to a stage one cache. The incoming PDU may be received in an obfuscated state in which a control portion is obfuscated. The control portion comprises information identifying the incoming PDU, and/or destination information indicative of at least one destination node for the incoming PDU. A stage one cache lookup is performed, based on at least a portion of the incoming PDU in the obfuscated state, to determine whether the incoming PDU matches information on a previously received PDU cached in a stage one cache. Depending on the stage one cache lookup, the node determines whether to perform a deobfuscation operation to deobfuscate the control portion of the incoming PDU and whether to perform continued processing the incoming PDU. This limits the number of deobfuscation operations required, which can save processing resource and power.

16 Claims, 3 Drawing Sheets

STAGE ONE CACHE LOOKUP FOR NETWORK NODE OF MESH NETWORK

This application claims priority to EP Patent Application No. 18464004.3 filed Nov. 20, 2018, the entire contents of which are hereby incorporated by reference.

The present technique relates to the field of networks.

In a mesh network, nodes of the network may be connected to each other directly and dynamically in a non-hierarchical manner (rather than being connected via routing components such as central switches, routers or bridges), so messages may pass from one node to another via any route, and possibly via a number of different alternative routes. Mesh networks may be dynamically self-organising and self-configuring which can reduce installation overhead. Mesh networks can also provide improved fault tolerance and reduced maintenance costs, as if one node fails then messages may still be routed via other paths.

At least some examples provide a method for controlling processing of a protocol data unit (PDU) at a network node of a mesh network, the method comprising: receiving an incoming PDU from an upstream node of the mesh network in an obfuscated state in which a control portion is obfuscated, the control portion comprising at least one of PDU identification information for identifying the incoming PDU and destination information indicative of at least one destination node for the incoming PDU; performing a stage one cache lookup, based on at least a portion of the incoming PDU in the obfuscated state, to determine whether the incoming PDU matches information on a previously received PDU cached in a stage one cache; and depending on the stage one cache lookup, determining whether to perform a deobfuscation operation to deobfuscate the control portion of the incoming PDU and whether to perform continued processing of the incoming PDU.

A computer program may be provided to control a data processing apparatus to perform the method described above. A storage medium may store the computer program. The storage medium may be a non-transitory storage medium.

At least some examples provide a network node for a mesh network, comprising: interface circuitry to receive an incoming PDU from an upstream node of the mesh network in an obfuscated state in which a control portion is obfuscated, the control portion comprising at least one of PDU identification information for identifying the incoming PDU and destination information indicative of at least one destination node for the incoming PDU; deobfuscation circuitry to perform a deobfuscation operation to deobfuscate the control portion of the incoming PDU; and control circuitry to: perform a stage one cache lookup, based on at least a portion of the incoming PDU in the obfuscated state, to determine whether the incoming PDU matches a previously received PDU cached in a stage one cache; and depending on the stage one cache lookup, control whether the deobfuscation circuitry performs the deobfuscation, and whether to perform continued processing of the incoming PDU.

A mesh network may be provided comprising at least one network node as described above.

Further aspects, features and advantages of the present technique will be apparent from the following description of examples, which is to be read in conjunction with the accompanying drawings, in which.

Figure 1:
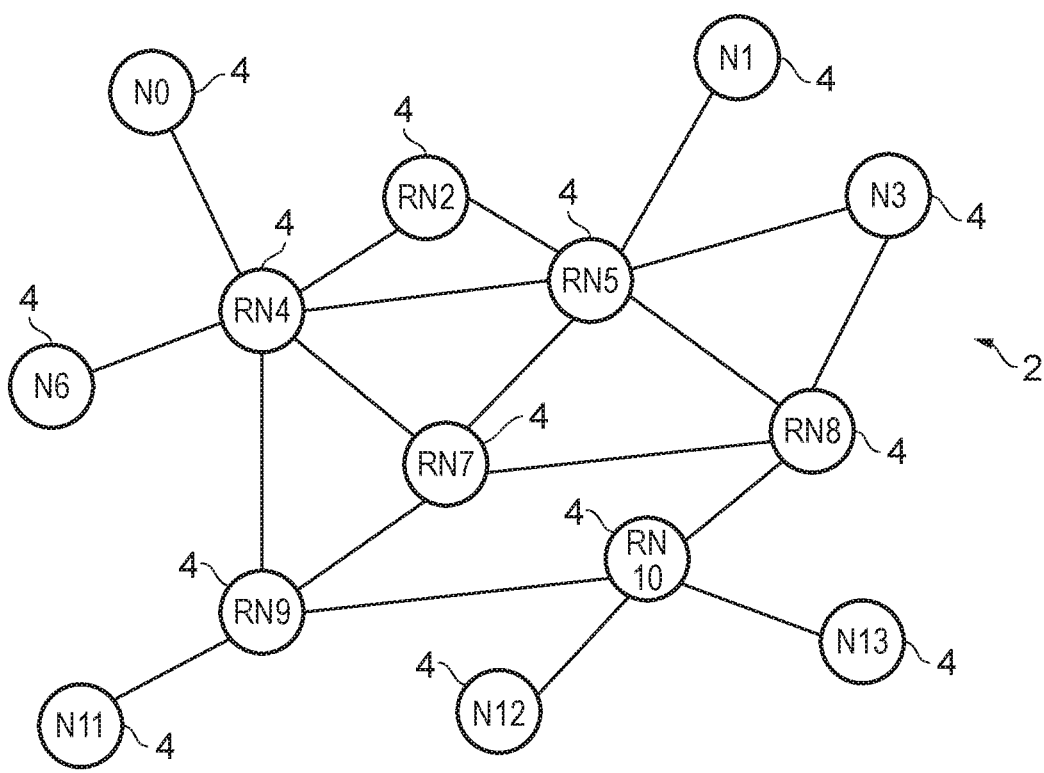
FIG. 1 shows a schematic illustration of an example mesh network.

A method is provided for controlling processing of a protocol data unit (PDU) at a network node of a mesh network. A PDU may be the minimum unit of data at the granularity with which propagation of the data across the network is controlled. Hence, the routing of one PDU may be controlled independently from the routing of another PDU.

For a number of reasons, in some scenarios two or more PDUs each corresponding the same message may be received at the same node of the mesh network. For example, some networks may support a flooding mode of relaying messages across the network, in which when a given relay node of the network receives the message from a source node, the relay node routes corresponding messages to each other network node to which that relay node is connected. By routing the message over as many network paths as possible, this increases the chance that the message rapidly reaches its intended destination. However, the flooding mode of distribution may make it likely that multiple PDUs corresponding to the same message may be received at a given network node, via alternative paths to the same node.

Also, in some systems a message may be retransmitted multiple times by the source node from which the message originated, e.g. for providing redundant transmission for robustness against transmission errors. Hence, even if relaying messages according to a single defined route across the network (not using the flooding mode), there could still be a chance that two or more PDUs corresponding to the same message may be received by a given network node.

Hence, it may be desirable to check, when an incoming PDU has been received, whether it relates to the same message as an earlier received PDU, so that continued processing of the incoming PDU can be suppressed if the PDU has already been processed before, to save processing resource at that network, and if the continued processing involves forwarding the PDU on to other nodes, also saving network bandwidth.

A PDU may include a control portion, which may provide PDU identification information for identifying the incoming PDU (e.g. a message ID, and/or information on the source node transmitting the message) and/or destination information indicative of at least one destination node intended for the incoming PDU. In some network protocols, the control portion of the PDU may be obfuscated, to prevent an eavesdropper being able to track traffic from specific devices or use an analysis of the contents of the PDU control portion to deduce information about the network configuration. Such obfuscation may for example be based on a cryptographic operation applied to the control portion of the PDU, separate from any encryption applied to the message payload associated with the PDU.

Hence, when the incoming PDU has an obfuscated control portion, the network node receiving the incoming PDU may need to perform a deobfuscation operation to deobfuscate the control portion, before it can fully decide how to perform continued processing of the incoming PDU. For example, a given node of the network may need to deobfuscate the control portion to determine whether it is the destination node for that PDU or whether the PDU should be forwarded onto another destination node. One approach for controlling processing of the incoming PDU may be to always deobfuscate the control portion of the incoming PDU and then determine based on information resulting from that deobfuscation operation whether the incoming PDU matches any previously received PDU and if so to suppress continued processing of the incoming PDU. However, the deobfuscation operation may be a cryptographic operation which may be relatively numerically intensive and may consume a significant amount of processing power.

In the technique discussed below, a stage one cache is provided to cache information on previously received PDUs, which is looked up based on at least a portion of the incoming PDU in the obfuscated state, to determine whether the incoming PDU matches cached information on a previously received PDU. Depending on the stage one cache lookup, the network node determines whether to perform the deobfuscation operation to deobfuscate the control portion of the incoming PDU, and determines whether to perform continued processing of the incoming PDU.

Hence, in cases where there is a hit in the stage one cache, the deobfuscation operation can be omitted and continued processing of the incoming PDU can be suppressed, without needing to perform the deobfuscation operation itself. This can save a significant amount of processing power and provide increased speed of execution. Hence by providing a stage one cache which is looked up based on the incoming PDU pre-deobfuscation, this can improve performance. If a cache miss is detected in the stage one cache lookup, then an entry may be allocated to the stage one cache based on the incoming PDU in the obfuscated state, for matching against any later received PDUs which may relate to the same message as the incoming PDU.

In one example, the stage one cache may be the only cache of previously received PDUs implemented at the network node. Hence, in this case if there is a miss in the stage one cache, then continued processing of the incoming PDU is performed.

However, in some embodiments it can also be useful to provide stage two cache which caches information on previously received PDUs, where the stage two cache is looked up based on the information resulting from the deobfuscation operation. Hence, when the deobfuscation operation is performed, a stage two cache lookup may be performed based on information resulting from the deobfuscation operation, to determine whether the incoming PDU matches information on previously received PDUs cached in the stage two cache. Based on the stage two cache lookup, the network node may determine whether to perform continued processing of the incoming PDU.

One might expect that providing two separate caches both recording information on previously received PDUs may appear redundant. However in practice the combination of a stage 1 cache looked up pre-deobfuscation and a stage 2 cache looked up post-deobfuscation can provide better performance and energy efficiency by enabling additional PDUs, which cannot be detected as being the same as a previously received PDU by the stage 1 cache due to the obfuscation of the header, from being detected as matching a previously PDU so that further PDUs can have their continued processing filtered out to save bandwidth or processing power and increase processing speed.

If a cache hit is detected in the stage one cache lookup, the stage two cache lookup may be omitted to save the processing power and latency associated with accessing the stage two cache.

When a cache hit is detected in the stage two cache lookup, the continued processing of the incoming PDU is suppressed. When a cache miss is detected in the stage two cache lookup, the continued processing of the incoming PDU is allowed, and a new entry may be allocated to the stage two cache based on information on the incoming PDU resulting from the deobfuscation operation, to enable subsequently received instances of the same incoming PDU to hit in the stage two cache.

The provision of a two-stage cache can be particularly useful in cases where the obfuscated control portion of the incoming PDU includes some information which may take different values for different instances of the same message arriving at the network node (information capable of having different values for two or more PDUs relating to the same message payload). For example, the control portion could include a hop count field as discussed further below. If there is information which can take different values even though the PDUs relate to the same message, this will result in different values for the obfuscated control portion, and the fact that the different information causing those differences in the control portion is not in fact information which matters for the purpose of deciding whether the messages are the same may not be able to be detected unless the deobfuscation operation is performed. Hence, sometimes the stage one cache lookup could identify a cache miss, even though substantially the same message has already been received. In contrast, the stage two lookup performed post-deobfuscation can exclude the information which may take different values for different instances of the same message from the information used to look up the stage two cache. Hence, the stage two cache lookup may allow additional PDUs to be filtered out from continued processing which could not be filtered using stage one. On the other hand, the provision of the stage one cache allows the deobfuscation operation to be eliminated if there is a hit in the stage one cache for messages which share the same obfuscated control portion. Hence the provision of a two-stage cache lookup may provide a better performance overall compared to either providing stage one alone or providing stage two alone.

The technique using the stage one (and optionally stage two) caches discussed above may be applied at different nodes of the mesh network. In some examples the technique could be applied at a relay node which determines whether an incoming PDU should be forwarded as an outgoing PDU to a downstream node of the mesh network. Hence, in this example the continued processing, which is determined to be necessary or not depending on the cache lookups, may be the forwarding of the outgoing PDU to at least one downstream node. Hence, by preventing an outgoing PDU being relayed to a downstream node when the stage 1 and/or stage 2 cache lookup detects that the same message has already been received, this conserves network bandwidth and saves power and processing resource by avoiding a downstream node of the network needing to process another instance of the outgoing PDU.

Other examples of continued processing which can be filtered out based on the stage 1 and/or stage 2 cache lookup may include decryption of an encrypted message payload of the incoming PDU at the destination node, or performing integrity checks or error detection checks for the incoming PDU. Such operations may be relatively processor intensive and so it may be desirable to avoid performing them multiple times if the same PDU is received more than once by a given network node. The use of the stage one cache can allow such operations to be filtered without needing to perform the deobfuscation on the control portion of the incoming PDU.

The control portion of the PDU may include a hop count field, which may be used to control the routing of the PDU across the network. The hop count field may limit the maximum number of hops which the message can take across the network before it is no longer forwarded. This can be useful for preventing messages circulating around the network indefinitely. Hence, in cases where an outgoing PDU is forwarded, the hop count field in the outgoing PDU may be a decremented version of a deobfuscated hop count field in the control portion of the incoming PDU. In networks which use such a hop count field, the same message may arrive multiple times at the same network node, but if one of these messages has arrived following a different number of hops compared to another message, the two messages may have different values of the hop count field at the point when they are received by the network node. If the hop count field is within the control portion which is obfuscated, the stage one lookup performed in the stage one cache for the second arriving of these messages may identify a cache miss even though the same message has already been received, because the different hop count fields would mean that the obfuscated control portions are different, and without performing the deobfuscation the stage one cache lookup cannot tell that the messages are the same. However, the stage two cache lookup can overlook the difference in hop count fields between the different messages, as the stage two cache lookup may be performed independent of the deobfuscated hop count field which results from performing the deobfuscation operation. Hence, when the stage two cache lookup is performed for the second arriving of the two identical messages, the stage two cache lookup may identify a cache hit and so this can prevent the second of the two messages being forwarded on to downstream nodes, to save network bandwidth. Hence, the provision of a stage two cache enables such aliasing between messages with different hop count fields to still be detected.

The hop count field is an example of information which may change between the incoming PDU and the corresponding outgoing PDU which is forwarded downstream. It will be appreciated that other information could also be changed by the relay node, so it is not necessary for all information in the outgoing PDU to be identical to the corresponding information in the incoming PDU.

In some embodiments, the network node may have a configurable setting which controls whether the stage one cache lookup is enabled or disabled. For example some cache enable information (such as a configuration register or a status value recorded in memory) may be used to determine whether the stage one cache lookup is enabled or disabled. In such embodiments, when the incoming PDU is received, then the network node checks the stage one cache enable information and, if the stage one cache lookup is enabled, performs the stage one cache lookup and determines whether to perform the deobfuscation operation based on the stage one cache lookup, as described above. On the other hand if the stage one cache lookup is disabled, the stage one cache lookup may be omitted and instead the deobfuscation operation may be performed on the incoming PDU regardless of whether the incoming PDU has been received before. When the stage one cache lookup is disabled, processing can proceed to the stage two cache lookup once the deobfuscation has been carried out.

Hence, while the relay node may have support for performing the stage one cache lookup, it is not essential for this to be permanently enabled. It can be useful to provide the option to selectively disable the stage one cache lookup if desired, because for some network nodes it may be less likely that a stage one cache lookup would identify a hit than for others. For example, in systems which use the hop count field within the obfuscated control portion as discussed above, the stage one cache lookup may generate a cache hit in cases where the same message is received multiple times across network routes which have the same number of hops, but there may be a miss if the same message arrives via a route with a different number of hops compared to the route taken by the previously received instance of the same message. In some instances of a mesh network, there may be a particular node for which it is relatively unlikely that the same message can arrive multiple times at that node with identical hop counts, for example if the particular way in which that node has been connected to other nodes results in the paths to that node having different numbers of hops. Hence, some nodes of the network may benefit more from the stage one cache lookup than others.

By providing the ability to disable the stage one cache lookup when desired, this may in some cases improve performance by eliminating the latency/power overhead of looking up and maintaining the stage 1 cache, which may not be justified if the percentage of lookups which identify a cache hit is relatively low for a given node of the network. In some examples, the stage one cache enable information could be set statically by the system designer when they are configuring the network, based on knowledge of the way in which the network is being connected together. In other examples, the stage one cache enable information could be determined dynamically by the network node itself, for example by monitoring the operation of the network node over a period of time. For example the network node could initially enable the stage one cache lookup, but then keep track of the percentage or fraction of lookups which generate a hit, and if after monitoring the stage one cache hit rate for a certain period of time, it is determined that the stage one cache hit rate is less than a certain threshold, then the stage one cache enable information could be updated to disable the stage one cache lookup to save processing resource. Meanwhile at other nodes of the network where hits in the stage one cache are more frequent, the stage one cache lookup may still be enabled.

Hence, for improved balance between performance and cache access overhead, it can be useful to provide the framework within which the network node is capable of looking up a stage one cache if required, but this can be selectively disabled using the configuration information for a given network node.

The stage one and stage two caches described above can be implemented in different ways. In some embodiments, the stage one cache and/or stage two cache may be implemented as a hardware cache structure in dedicated circuit logic provided at the network node. For example, cache access circuit logic may be provided to lookup a hardware memory structure based on the obfuscated version of the incoming PDU (for stage 1 cache lookups) or the deobfuscated version of the PDU (for stage two cache lookups), and return the information used to decide whether to continue processing of the incoming PDU. In some cases, cache maintenance (to allocate a new entry to the cache for an incoming PDU which caused a cache miss) could also be hardware controlled by dedicated hardware logic. A hardware-implemented cache may be faster in terms of performance, but may increase circuit area and power consumption.

In other examples, the stage one cache and/or stage two cache may be implemented as a software-maintained cache, by using a region of a general purpose memory allocated for representing the stage one or stage two cache. In this case, the functionality of the stage one and stage two cache may be implemented using software instructions which take the information from the obfuscated or deobfuscated PDU, and look up the relevant region of memory corresponding to the stage 1 cache or stage 2 cache, to determine whether corresponding information has previously been received. The software may also control the maintenance of the cache to allocate new entries for the cache when there is a cache miss.

In systems having both stage 1 and stage 2 caches, in some examples both could be hardware-implemented caches, or both software-implemented caches. However, it is not essential for both the stage one and stage two caches to be implemented in the same way. For example it would be possible for the stage two cache lookup to be implemented using a hardware-implemented cache but the stage one cache lookup to be software-implemented, or vice versa.

Also, some caching techniques could use a combination of dedicated hardware cache access circuit logic and software to implement the functions of either the stage 1 cache, the stage cache 2 or both.

The techniques discussed above may be used in any mesh network protocol. However they can be particularly useful in a BLE (Bluetooth® Low Energy) mesh network. In the BLE mesh network specification, it is required to obfuscate the control portion which includes the destination information and the hop count field (TTL), which can make looking up of a cache post-obfuscation relatively slow given the delay and processing power consumed in performing the deobfuscation operation. By providing the stage one cache lookup to enable PDUs to be filtered out before the obfuscation, this can improve performance.

FIG. 1 shows an example of a mesh network 2 which includes a number of network nodes 4 which are connected together in a particular topology as shown in example of FIG. 1. Each of the nodes may for example be electronic devices, sensors or other devices, for example in the Internet of Things. For example, the nodes could include temperature sensors, pressure sensors, control units for controlling some system such as a lighting, heating or air conditioning system, as well as larger scale electronic devices such as a mobile telephone, tablet computer, laptop or personal computer etc.

As shown in FIG. 1, the network may include some relay nodes (RN) which forward received PDUs onto other downstream nodes of the network, and some non-relay nodes (N) which do not forward on received PDUs. Routing of PDUs across the network may be controlled based on either a routing mode or a flooding mode. In a routing mode the source node sends a PDU representing its message to the destination node via a specific path of the network, either directly or via one or more relay nodes. For example, if a message needs to be routed from node N6 to node N3 in the example of FIG. 1, in the routing mode a path passing via relay nodes RN4, RN7 and RN8 could be selected to transmit the message to the destination node N3. The selection of which particular path to use could depend on current network utilisation or on previously defined control data.

However, the network may also support a flooding mode of PDU routing, where each PDU may be routed over every possible path of the network to increase the chance that the PDU can quickly reach its intended destination or destinations. For example, if node N6 needs to transmit messages to a group of destination nodes including other nodes RN2, N13 and N11, node N6 could send a PDU to the nearest relay node RN4, then RN4 could forward a corresponding outgoing PDU to every other node connected to RN4 (i.e. to nodes N0, RN2, RN7 and RN9), then relay nodes RN2, RN7, RN9 may each transmit further PDUs to each of their connected nodes other than the one from which the incoming PDU was received, and so on until the PDUs reach their intended destinations.

The flooding mode has a benefit that PDUs can quickly reach their intended destination and there does not need to be any pre-knowledge as to the configuration of the network, which can be beneficial for mesh networks where the nodes may be self-configuring and frequently subject to different connections between nodes. This can also be beneficial for dealing with cases where one particular link of the network is out of action, for example because one node has been turned off.

However in the flooding mode of distribution there is a chance that the same node may receive multiple PDUs each representing the same message. For example, in the example of a message originating from node N6 described above, node RN10 could receive PDUs from both relay nodes RN8 and RN9.

Hence, it can be useful to provide for caching of previously received PDUs at a given node 4 of the network 2, so that once a PDU has been processed once by a given node, then if the same PDU is received again then further processing operations performed on the second PDU (such as forwarding to downstream nodes, decryption of the message payload, or error or integrity checks) can be omitted the second time to avoid waste of processing power and time.

Figure 2:
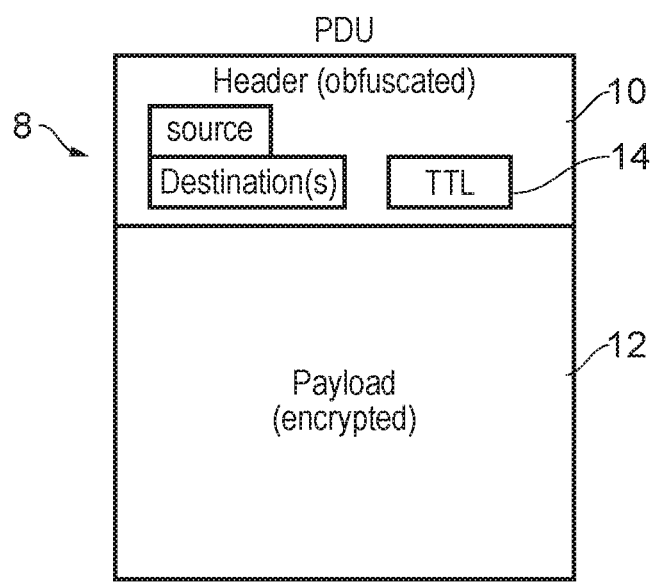
FIG. 2 shows an example of a protocol data unit.

FIG. 2 shows an example structure of a PDU 8, which is a unit of data transmission within the network. The PDU 8 may include a header 10 and a payload 12 (and sometimes a footer, not shown in FIG. 2), where the header may include source and destination addresses plus some additional control information. The payload 12 may be encrypted with an additional integrity code to prevent a casual (i.e. without knowledge of the network key) man-in-the-middle (MITM) being able to interpret or modify the payload. However, the header is not typically encrypted using the same key as the payload, as it may contain control information for the actual cryptographic operations needed to decrypt and authenticate the payload, and could also include information needed for routing control of the PDU. Hence, if the header is sent without further obfuscation, a casual eavesdropper may still be able to track source/destination addresses of network PDUs it intercepts, and this could allow the eavesdropper to build a picture of network operation, which could reveal a significant amount of information about the specific devices at each node 4, and their usage.

To prevent the ability to track the operation of the devices 4 in this manner, an obfuscation operation can be applied to the network PDU header 10 of each transmitted PDU 4, which may a cryptographic operation that effectively randomises the contents of the network PDU header, changing it on a PDU-by-PDU basis. The deobfuscation prevents a causal eavesdropper being able to track traffic from specific devices. When a network PDU is received by a given node, the node may therefore perform an inverse cryptographic process called deobfuscation to reveal the header. The obfuscation applied to the header 10 may be different from the encryption applied to the payload 12, in that the encrypted payload may only be decrypted by the correct destination node for the message, while the header 10 may be deobfuscated by any intervening node 4 of the network to enable routing control by that node.

As well as the source and destination information, the header portion 10 of the PDU 8 may also include a hop count field 14, also known as the time to live (TTL) value. This may take an integer value and may be used to limit the number of hops a given message may take across the network before it is no longer relayed. For example, if TTL is set to 3, this will result in the message being relayed a maximum of 3 hops away from its source node. The TTL value 14 is useful for limiting the number of hops so that messages do not continue circulating around the network indefinitely, to save network bandwidth. Setting TTL in an original message to 0 will result in it only travelling a single hop and not being relayed at all. In general, if a given relay node of the network receives an incoming PDU with a TTL value 14 of 2 or more, then this means it is allowed to be relayed to a downstream node, where the outgoing PDU sent downstream will have the TTL value decremented (reduced by 1) relative to the TTL value in the incoming PDU. Hence, the outgoing PDU may not be exactly the same as the incoming PDU as at least the TTL value will be decremented. Since the header 10 is obfuscated this means that in fact the header of the outgoing PDU may appear quite different to the header in the corresponding incoming PDU as even a change in one bit of the TTL value 14 could result in many bits of the header following the obfuscation operation changing values. When an incoming PDU is received at a given node with a TTL value of 1 then this means that the message may have been relayed at least once before, so has not necessarily originated from the node which sent that incoming PDU to the current node, but indicates that the message should not be relayed again. A PDU received with TTL equal to 0 indicates that this is a point to point message sent from one specific node without being relayed at all. For some applications it can be useful to distinguish whether messages are relayed or not.

A network cache may be provided at a given node 4 of the network, to prevent unnecessary forwarding or ongoing processing of network PDUs when the PDU has been received before. A node will forward a network PDU if it is not the destination of the network PDU. In a flooding mode of transmission in the mesh network, it is likely one node will hear the same network PDU from many neighbouring nodes, and so without the concept of a network cache, the node would forward every received network PDU not destined for that node. This would create an increasing amount of traffic as the network PDU progresses through the mesh, to the point of saturation.

To prevent this, on receipt of a network PDU, the network cache checks whether the same network PDU has already been received and thus forwarded. If it has, it simply discards the incoming network PDU without continued processing of that PDU. This ensures that a node will only forward a given network PDU once (per outgoing path from that node), thus limiting the amount of onward traffic.

Figure 3:
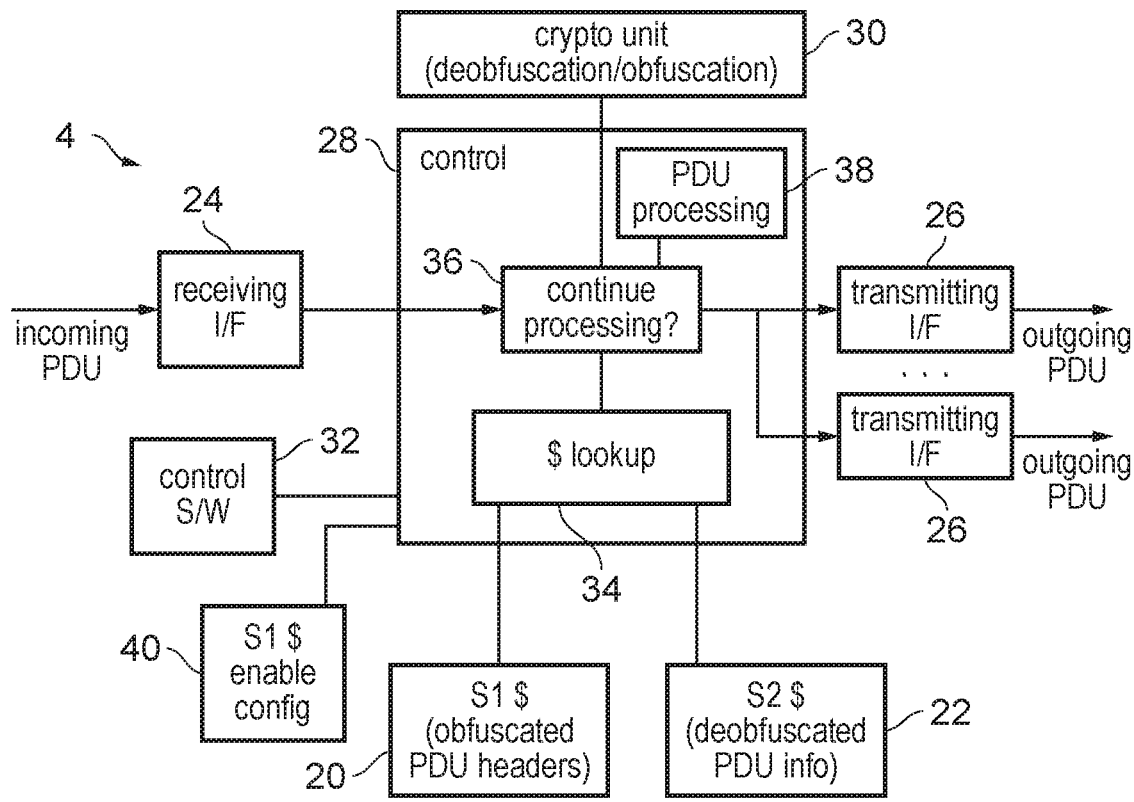
FIG. 3 shows an example of components of a network node.

As shown in FIG. 3, a given network node 4 may use a two-stage network cache, comprising a stage one cache 20 and a stage two cache 22, to control the filtering of network PDUs, to prevent unnecessary forwarding or continued processing of PDUs which have been seen before. As shown in FIG. 3, the node may have a receiving interface 24 over which incoming PDUs are received from an upstream node of the network, and optionally may have one or more transmitting interfaces 26 for transmitting outgoing PDUs to downstream nodes of the network. In some cases the receiving and transmitting interfaces 24, 26 may actually be the same interface. Also some non-relay nodes may not have multiple transmitting interfaces, as they may only be able to transmit their own originating messages but may not be able to relay messages which have been received from other nodes.

The network node 4 also has a control unit 28 for controlling processing of the incoming PDU and determining whether continued processing of the PDU is necessary based on the lookup of the two-stage network cache structure 20, 22. This continued processing could include the forwarding of the incoming PDU as a corresponding outgoing PDU to downstream nodes, or could involve local processing of the PDU, such as decryption of the payload 12 or performing integrity checks for verifying whether the PDU has been correctly formed according to the network protocol, or error detection/correction checks for checking error detecting/correcting codes associated with the PDU to check whether any transmission errors have occurred in transit. The network node 4 has a cryptographic unit 30 for performing the deobfuscation and obfuscation operations for processing the header 10 of PDUs. The cryptographic unit may also be used to decrypt and encrypt payloads 12 of the PDUs, for messages for which the node 4 is a destination or source for the message.

In some instances, the control unit 28 may be a general purpose central processing unit (CPU) or other processor core, which may be controlled to perform its functions based on control software 32 stored in a memory or other storage unit. Alternatively, the control unit 28 could be implemented using dedicated hardware logic such as an integrated circuit or FPGA. The control unit 28 may have a number of functions including a cache lookup function 34 for looking up the stage one cache 20 or stage two cache 22 to determine whether an incoming PDU has been encountered before, and a control function 36 for determining based on the cache lookup function 34 whether to continue processing the incoming PDU. There may also be a PDU processing function 38 for performing the continued processing on a PDU for which the current node is a destination node of the PDU, such as performing the integrity checking or error correction checking operations or decrypting the payload.

As shown in FIG. 3, the cache structure is divided into a stage one cache 20 which is looked up based on at least a portion of the obfuscated PDU header 10, prior to performing any deobfuscation of the header, and a stage two cache 22 which is looked up based on information derived from the deobfuscation after a PDU has had its header deobfuscated. The stage two cache lookup may be independent of the TTL value 14 (or any other information which may take different values for difference PDUs originating from the same source message) but may depend on the source and destination information and other information included in the deobfuscated header which is unique to a particular message. Splitting the cache structure into two stages like this enables the numerically intensive deobfuscation operation for deobfuscating the header to be eliminated in cases where the obfuscated PDU header matches a corresponding obfuscated PDU header of a previously received PDU.

The stage 1 cache 20 can be useful for filtering out cases where a given node of a network receives the same PDU multiple times over network paths involving the same number of hops, so that the TTL field 14 in both the received packets is the same. For example when the initiating node of the network in FIG. 1 is node N6, and the node shown in FIG. 3 is relay node RN5, the PDUs could reach RN5 from the initiating node N6 in 3 hops via two different paths, one going from N6-RN4-RN2-RN5 and the other going from N6-RN4-RN7-RN5. Hence, when RN5 receives the PDU the first time this may result in a cache miss in the stage one cache 20, and so a new entry may be allocated in the stage one cache based on the obfuscated PDU header of the received PDU. As the PDU missed in the stage one cache, the header 10 can then be deobfuscated by the cryptographic unit 30 and then the information derived from the deobfuscated header can be looked up in the stage two cache to determine whether it matches, and again this may miss and then it can be determined that as the PDU has not been seen before, continued processing is necessary (e.g. involving forwarding of the corresponding outgoing PDU downstream, or processing of the message payload if RN5 was the intended destination).

On the other hand, if RN5 receives a second identical packet with the same TTL count as a previously seen packet, then this time the lookup in the stage one cache 20 may identify a hit and then the control unit 28 can determine that there is no need to continue processing that incoming PDU because this has already been done before. Hence the incoming PDU can simply be discarded without needing to perform the deobfuscation at all, let alone the continued processing by the PDU processing function 38 or the forwarding of the PDU downstream Hence, an advantage of providing the stage one cache is that this limits the number of deobfuscation operations required across the network. As this is a cryptographic operation, it is typically numerically intensive and may consume a significant amount of processing power. Hence eliminating the deobfuscation of the header on an incoming PDU when possible helps to increase speed of execution and to save processing power.

On the other hand, the provision of the additional stage two cache 22 allows further filtering of unnecessary processing operations for repeatedly received PDUs, by allowing additional detection of cases where incoming PDUs which both originated from the same source message have been received at the same downstream node, but over paths with different hop counts. Hence, these messages may have different values for the TTL field, as the TTL value will have been decremented different numbers of times across the different paths. Again, considering example of FIG. 1, node RN7 could receive the same message from originating N6 twice, once over a two-hop path N6-RN4-RN7, and once over a three-hop path N6-RN4-RN9-RN7. These received incoming PDUs would have different values for the obfuscated header because the TTL value would have been decremented an additional time by node RN9 compared to the TTL value in the PDU received from node RN4. Hence these PDUs would miss in the stage one cache 20, but may hit in the stage two cache once the header 10 has been deobfuscated, because the deobfuscation allows the TTL value to be determined and eliminated from the information to be looked up in the stage two cache. Hence, the provision of a two-stage cache may provide a better performance overall compared to either the stage one cache 20 or stage two cache 22 alone.

If there are any network nodes where it is very unlikely that the same message will be received multiple times across paths with the same hop count, then configuration data 40 may be set in a register or other storage location accessible to the control unit 28. The configuration data may selectively enable or disable the lookup in the stage one cache 20. For example, the particular network of interconnections between nodes 4 for a given implementation of the network 2 may be such that one particular node always receives its multiple copies of the same PDU via paths with different numbers of hops, so that there is very little chance of a hit in the stage one cache. The control unit 28 could monitor cache hit rates and then set the stage one enable configuration information 40 to disable the stage one lookup if the hit rate is relatively low, to eliminate the power and latency associated with looking up the stage one cache 20. Nevertheless, by having the infrastructure for supporting the stage one cache this enables those nodes where the stage one cache is beneficial to use that resource to filter out unnecessary deobfuscations.

The stage one cache 20 and stage two cache 22 may be implemented either as hardware cache structures using dedicated circuits for storing the cached information on previously received PDUs, and using dedicated lookup logic for looking up the cache based on information on an incoming PDU provided either in an obfuscated state (for stage 1) or deobfuscated state (for stage 2). Alternatively, the stage 1 cache 20 and/or stage 2 cache 22 could be maintained in software by instructions included in the control software 32 of the control unit 28, where the cache may be stored as a data structure at certain addresses within a general memory (RAM) which is also used for other purposes.

In some examples the stage two cache 22 could be omitted and the device may only perform a stage one lookup. However, providing the stage two cache in addition to stage 1 can be beneficial for performance for the reasons given above.

Figure 4:
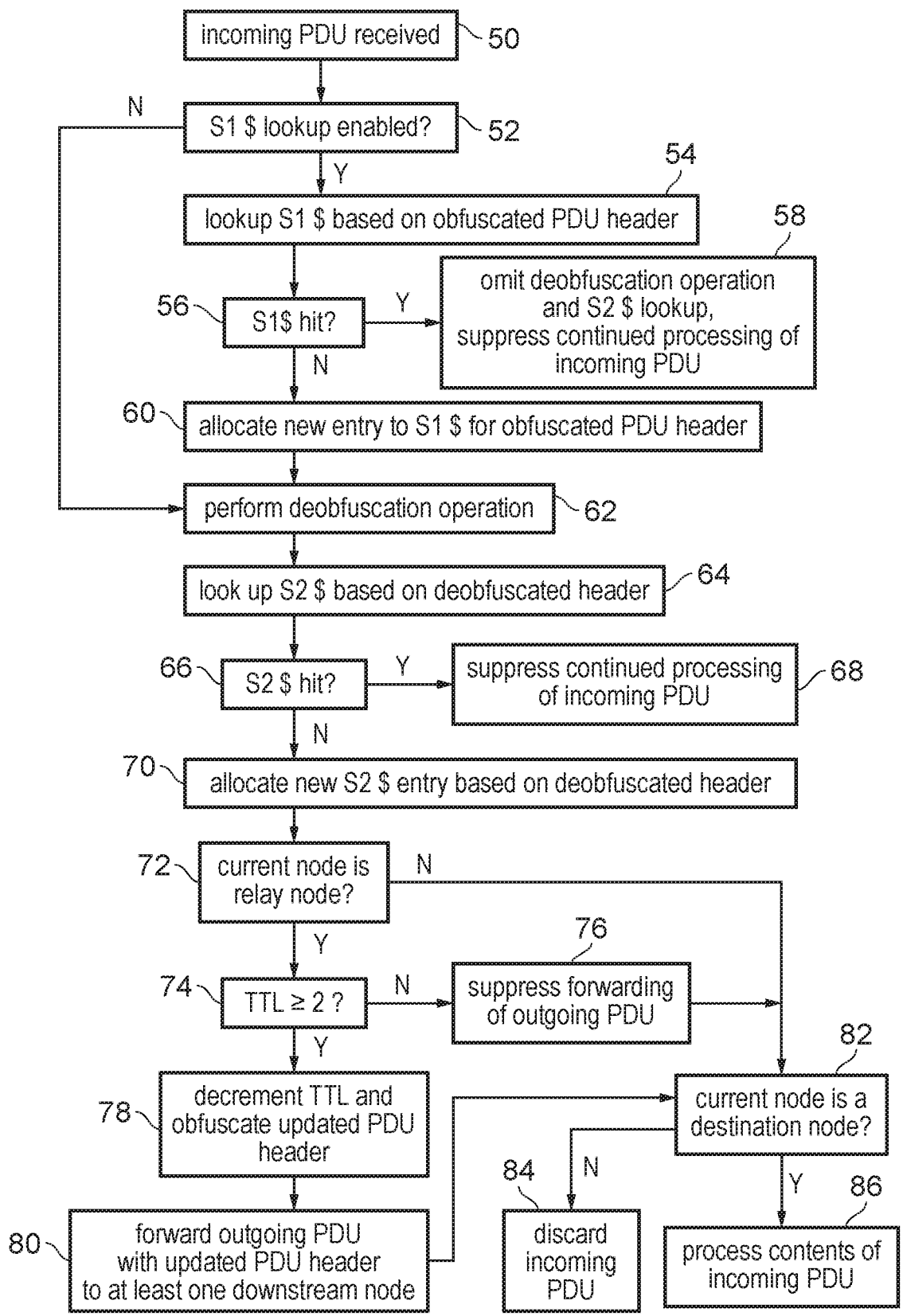
FIG. 4 is a flow diagram showing a method of controlling forwarding of a protocol data unit.

FIG. 4 shows a flow diagram showing an example of a method for controlling the processing of an incoming PDU by the control unit 28 of a network node 4. At step 50, the receiving interface 24 receives an incoming PDU from an upstream node. It will be appreciated that in a mesh network, there is no fixed relationship between nodes or predetermined direction of travel of PDUs, so for a given node of the network which receives an incoming PDU over the network, the term "upstream node" refers to the particular node which transmitted that incoming PDU to the given node. The same network node could receive PDUs from a number of different upstream PDUs. Similarly, the term downstream node refers to the node of the network to which a given network node transmits a PDU. The same network node could transmit PDUs to a number of different downstream PDUs. Relative to the given network node, another node of the network could serve both as an upstream node when the other network node transmits a PDU to the given network node, or as a downstream node when the given network node transmits a PDU to the other network node.

At step 52 the control unit 28 checks the stage one cache enable configuration information 40 to determine whether a lookup of the stage one cache has been enabled. If a stage one cache lookup is enabled then at step 54 the control unit 28 looks up the stage one cache 20 based on the obfuscated header portion of the incoming PDU. At step 56 the control unit 28 determines whether there has been a stage one cache hit, that is whether the obfuscated PDU header of the incoming PDU matches any previously cached obfuscated PDU header associated with a previously received PDU. If there is a hit then at step 58 there is no need to perform any deobfuscation of the header of the received PDU, as it will already have been done before for the previously received PDU, and so the deobfuscation operation by the cryptographic unit 30 is omitted. Also the stage two cache lookup can be omitted and any continued processing of the incoming PDU can be suppressed. Hence the incoming PDU can simply be discarded without being passed on to any further processing.

If there is a miss in the stage one cache 20, i.e. the obfuscated PDU header does not match any cached obfuscated header for a previously received PDU, then at step 60 a new entry is allocated to the stage one cache 20 to specify the obfuscated PDU header for the currently received incoming PDU. The stage one cache 20 may have a finite number of entries and so if all of the entries have already been allocated to other PDUs then it may be necessary to evict a previously allocated PDU header from the stage one cache to make way for the new entry. Any victim selection policy may be used for the eviction, for example round robin or least recently used.

At step 62 the deobfuscation operation is performed for the incoming PDU, to deobfuscate the header 10 so as to allow the control unit access to its contents in the clear. Step 62 is performed either if at step 52 it was determined that the stage one cache lookup was disabled, or if the stage one cache lookup was enabled but step 56 identified that there was a miss in the stage one cache 20.

At step 64, the control unit 28 looks up the stage two cache 22 based on the deobfuscated information extracted from the header 10 in the deobfuscation operation performed by the cryptographic unit 30. For example, the lookup could be based on the source/destination addresses included in the header 10, as well as based on a message ID which distinguishes different messages sent between the same pair of source/destination nodes. The TTL field 14 may be excluded from the information used to look up the stage two cache, so that two PDUs which are received with different TTL values but otherwise contain matching information in their headers may both map to the same entry of the stage two cache so that they are considered to represent the same PDU. This ensures that even if the same PDU is received twice via routes with different numbers of hops, the aliasing can still be detected to avoid repeated processing of the same packet.

At step 66 the control unit 28 determines whether there has been a hit in the stage two cache 22. If there is a hit in the stage two cache 22, then at step 68 continued processing of the incoming PDU is suppressed. Hence, if the current node is a relay node then any ongoing forwarding of the PDU to a downstream node is suppressed. Similarly, if the current node is a destination node for the PDU, any continued processing of that message can be omitted. For example, decryption of the payload 12, error detection or packet integrity checks, or any other operations which would normally be performed on a received PDU can all be omitted, to save processing resource and increase speed of operation at the network node.

If at step 66 the stage two cache lookup identifies a cache miss, then at step 70 a new stage two cache entry is allocated to cache the information extracted from the deobfuscated header of the incoming PDU, for matching against on subsequent stage two cache lookups for PDUs received later. If necessary, a previously allocated entry could be evicted to make way for the new entry if there is no invalid entry that can be allocated, with the victim entry that is evicted being selected according to an eviction policy such as round robin or least recently used.

As there is a miss in the stage two cache, then ongoing processing of the current PDU is needed because the current PDU has not been seen before (or if it has been seen before, enough other PDUs have been seen since so that any previously cached entry for the current PDU has already had to be evicted from the cache).

At step 72, it is determined whether the current node is a relay node of the network. If so, then at step 74 it is determined whether the TTL field 14 in the incoming PDU is greater than or equal to 2 and, if the TTL is 0 or 1 then any forwarding of the outgoing PDU is suppressed because the TTL value 14 indicates that the PDU should not be routed further beyond the current node. However, if at step 74 the TTL field is equal to 2 or higher then at step 78 the controller 28 decrements the TTL field to generate an updated PDU header which is then obfuscated by the cryptographic unit 30, and then the newly generated obfuscated header is included together with the encrypted payload 12 from the incoming PDU to generate an outgoing PDU which is then forwarded with its updated header to at least one downstream node of the network at step 80.

If at step 72 the current node was not a relay node, then the method proceeds to step 82. Also, following either step 76 or step 80 the method continues to step 82. At step 82 the controller checks whether the current node is a destination node for the received incoming PDU. If not then the incoming PDU is discarded at step 84, as there is no need for the current node to process it further. If the current node is a destination node for the PDU, then at step 86 the control unit 28 processes the contents of the incoming PDU. For example this processing may include the integrity or error detection checks described above, the decryption of the payload 12, and any actions that may be instructed by the contents of the decrypted message payload 12.

Figure 5:
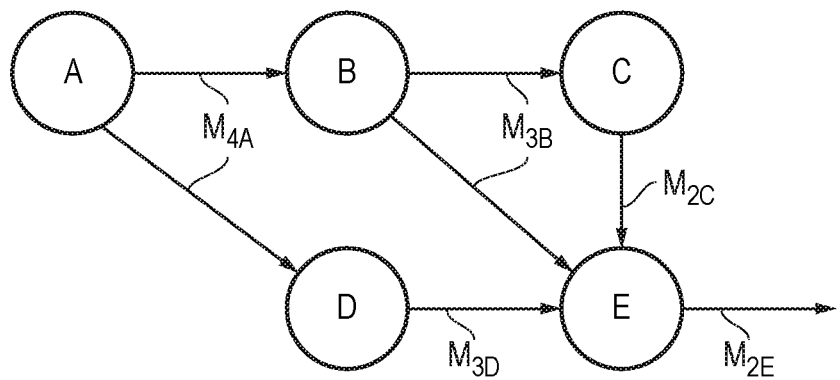
FIG. 5 shows an example of relaying messages using a flooding node in a mesh network.

An example of the stage 1 and stage 2 cache lookups is now described with reference to FIG. 5 which shows, for ease of explanation, a simplified network diagram showing only five network nodes labelled A to E. A flooding mode of message distribution is used, where a message originating from node A is routed over every possible path of the network. Each of the PDUs sent on the respective paths of the network are labelled with a label $M_{T,N}$, where T represents the TTL field 14 for that PDU and N indicates the node 4 of the network which transmitted that PDU. Hence, when these messages are processed using the method shown in FIG. 4, the routing may proceed as follows:

1. Node B receives relayed message $M_{4,A}$ from Node A.
   a. Node B detects a stage 1 cache miss for $M_{4,A}$, and allocates an entry in the stage 1 cache of node D for storing the obfuscated header of $M_{4,A}$.
   b. $M_{4,A}$ is deobfuscated at node B.
   c. $M_{4,A}$ causes a stage 2 cache miss at node B, so an entry is allocated in the stage 2 cache of node B for storing the deobfuscated information from the header 10 of $M_{4,A}$, and message $M_{4,A}$ is passed on for further processing.
   d. $M_{4,A}$ is relayed by Node B as $M_{3,B}$, decrementing the TTL by 1.
2. Node D receives relayed message $M_{4,A}$ from Node A.
   a. Node D detects a stage 1 cache miss for $M_{4,A}$, and allocates an entry in the stage 1 cache of node D for storing the obfuscated header of $M_{4,A}$.
   b. $M_{4,A}$ is deobfuscated at node D.
   c. $M_{4,A}$ causes a stage 2 cache miss at node D, so an entry is allocated in the stage 2 cache of node D for storing the deobfuscated information from the header 10 of $M_{4,A}$, and message $M_{4,A}$ is passed on for further processing.
   d. $M_{4,A}$ is relayed by Node D as $M_{3,D}$, decrementing the TTL by 1.
3. Node C receives relayed message $M_{3,B}$ from Node B.
   a. Node C detects a stage 1 cache miss for $M_{3,B}$, and allocates an entry in the stage 1 cache of node C for storing the obfuscated header of $M_{3,B}$.
   b. $M_{3,B}$ is deobfuscated at node C.
   c. $M_{3,B}$ causes a stage 2 cache miss at node C, so an entry is allocated in the stage 2 cache of node C for storing the deobfuscated information from the header 10 of $M_{4,A}$, and message $M_{3,B}$ is passed on for further processing.
   d. $M_{3,B}$ is relayed by Node C as $M_{2,C}$, decrementing the TTL by 1.
4. Node E receives relayed message $M_{3,D}$ from Node D.

a. Node E detects a stage 1 cache miss for $M_{3D}$, and allocates an entry in the stage 1 cache of node E for storing the obfuscated header of $M_{3D}$.
b. $M_{3D}$ is deobfuscated at node E.
c. $M_{3D}$ causes a stage 2 cache miss at node E, so an entry is allocated in the stage 2 cache of node E for storing the deobfuscated information from the header 10 of $M_{3D}$, and message $M_{3D}$ is passed on for further processing.
d. $M_{3D}$ is relayed by Node E as $M_{2E}$, decrementing the TTL by 1.
5. Node E receives relayed message $M_{3B}$ from Node B.
a. $M_{3B}$ causes a stage 1 cache hit, and so the deobfuscation operation and the stage 2 cache lookup are omitted, and $M_{3B}$ is discarded without continued processing.
6. Node E receives relayed message $M_{2C}$ from Node C.
a. Node E detects a stage 1 cache miss for $M_{2C}$ (although this message is the same as previously cached $M_{3D}$, it misses in stage 1 due to the different TTL value of 2 instead of 3), and allocates an entry in the stage 1 cache of node E for storing the obfuscated header of $M_{2C}$.
b. $M_{2C}$ is deobfuscated at node E.
c. Node E detects a stage 2 cache hit for $M_{2C}$ because the TTL value is excluded from the cache lookup and the other header information from the deobfuscated header matches against the cached entry for previously received PDU $M_{3D}$. Hence, $M_{2C}$ is discarded without continued processing.

Hence, the stage 1 cache was able to filter out continued processing of $M_{3B}$ at node E and the stage 2 cache was able to filter out continued processing of $M_{2C}$ at node E. This limits the number of deobfuscation operations, which can consume significant processing power, and increase speed of execution.

The particular example above involves a network where the same message could reach a given node across different routes of the network. The combination of the stage one and stage two caches can also be useful for nodes for which it is not possible to receive the same message twice via different routes. Even if there is only one unique route across the network to a given node of the network, some network protocols may involve retransmitting the same message a number of times from the source node, to provide redundancy for protecting against the probability of errors in transmission occurring on route. Hence, even if there is only one possible route to a given node, there could still be times when the same message is received again after previously having been processed, and so the use of the stage one and stage two caches described above can filter out the processing of that repeatedly transmitted message.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method for controlling processing of a protocol data unit (PDU) at a network node of a mesh network, the method comprising:
receiving an incoming PDU from an upstream node of the mesh network in an obfuscated state in which a control portion is obfuscated, the control portion comprising at least one of PDU identification information for identifying the incoming PDU and destination information indicative of at least one destination node for the incoming PDU;
performing a stage one cache lookup, based on at least a portion of the incoming PDU in the obfuscated state, to determine whether the incoming PDU matches information on a previously received PDU cached in a stage one cache; and
depending on the stage one cache lookup, determining whether to perform a deobfuscation operation to deobfuscate the control portion of the incoming PDU and whether to perform continued processing of the incoming PDU;
wherein when a cache miss is detected in the stage one cache lookup, an entry is allocated to the stage one cache based on the incoming PDU in the obfuscated state.

2. The method of claim 1, in which the mesh network comprises a Bluetooth Low Energy (BLE) mesh network.

3. A non-transitory storage medium storing a computer program to control a data processing apparatus to perform the method of claim 1.

4. The method of claim 1, in which the method comprises:
when the deobfuscation operation is performed, performing a stage two cache lookup based on information resulting from the deobfuscation operation to determine whether the incoming PDU matches information on a previously received PDU cached in a stage two cache, and based on the stage two cache lookup determining whether to perform said continued processing of the incoming PDU.

5. The method of claim 4, in which when a cache hit is detected in the stage one cache lookup, the stage two cache lookup is omitted.

6. The method of claim 4, in which when a cache hit is detected in the stage two cache lookup, continued processing of the incoming PDU is suppressed.

7. The method of claim 4, in which when a cache miss is detected in the stage two cache lookup, an entry is allocated to the stage two cache based on information on the incoming PDU, including information resulting from the deobfuscation operation.

8. The method of claim 4, comprising:
in response to receipt of the incoming PDU, checking stage one cache enable information to determine whether the stage one cache lookup is enabled or disabled;
when the stage one cache lookup is enabled, performing the stage one cache lookup and determining whether to perform the deobfuscation operation based on the stage one cache lookup; and
when the stage one cache lookup is disabled:
omitting the stage one cache lookup; and
performing the deobfuscation operation.

9. The method of claim 1, in which the control portion comprises at least one piece of information capable of having different values for two or more PDUs relating to the same message payload.

10. The method of claim 1, in which said continued processing comprises forwarding of an outgoing PDU corresponding to the incoming PDU to at least one downstream node of the mesh network.

11. The method of claim 10, in which:
when the deobfuscation operation is performed, whether the outgoing PDU is forwarded to the at least one downstream node is determined depending on a deobfuscated hop count field obtained from the control portion in the deobfuscation operation; and
when the outgoing PDU is forwarded to the at least one downstream node, the outgoing PDU comprises an obfuscated control portion determined based on a decremented version of said deobfuscated hop count field.

12. The method of claim 11, in which the method comprises:
when the deobfuscation operation is performed, performing a stage two cache lookup based on information resulting from the deobfuscation operation to determine whether the incoming PDU matches information on a previously received PDU cached in a stage two cache, and based on the stage two cache lookup determining whether to forward the outgoing PDU to the at least one downstream node; and
the stage two cache lookup is independent of said deobfuscated hop count field.

13. The method of claim 1, in which said continued processing comprises at least one of:
performing integrity checks or error detection checks for the incoming PDU; and
when the network node is one of said at least one destination node, decrypting a payload of the incoming PDU.

14. A method for controlling processing of a protocol data unit (PDU) at a network node of a mesh network, the method comprising:
receiving an incoming PDU from an upstream node of the mesh network in an obfuscated state in which a control portion is obfuscated, the control portion comprising at least one of PDU identification information for identifying the incoming PDU and destination information indicative of at least one destination node for the incoming PDU;
performing a stage one cache lookup, based on at least a portion of the incoming PDU in the obfuscated state, to determine whether the incoming PDU matches information on a previously received PDU cached in a stage one cache; and
depending on the stage one cache lookup, determining whether to perform a deobfuscation operation to deobfuscate the control portion of the incoming PDU and whether to perform continued processing of the incoming PDU;
wherein when a cache hit is detected in the stage one cache lookup, the deobfuscation operation is omitted and continued processing of the incoming PDU is suppressed.

15. A network node for a mesh network, comprising:
interface circuitry to receive an incoming PDU from an upstream node of the mesh network in an obfuscated state in which a control portion is obfuscated, the control portion comprising at least one of PDU identification information for identifying the incoming PDU and destination information indicative of at least one destination node for the incoming PDU;
deobfuscation circuitry to perform a deobfuscation operation to deobfuscate the control portion of the incoming PDU; and
control circuitry to:
perform a stage one cache lookup, based on at least a portion of the incoming PDU in the obfuscated state, to determine whether the incoming PDU matches a previously received PDU cached in a stage one cache;
depending on the stage one cache lookup, control whether the deobfuscation circuitry performs the deobfuscation, and whether to perform continued processing of the incoming PDU; and
when a cache miss is detected in the stage one cache lookup, allocate an entry to the stage one cache based on the incoming PDU in the obfuscated state.

16. A mesh network comprising at least one network node according to claim 15.

* * * * *